US010729199B2

(12) United States Patent
Jiang et al.

(10) Patent No.: US 10,729,199 B2
(45) Date of Patent: Aug. 4, 2020

(54) WEARABLE EQUIPMENT FOR SUBSTATION MAINTENANCE MOBILE INSPECTION AND APPLICATION METHOD THEREOF

(71) Applicants: STATE GRID HUNAN ELECTRIC POWER COMPANY LIMITED, Hunan (CN); STATE GRID HUNAN ELECTRIC POWER COMPANY LIMITED MAINTENANCE COMPANY, Hunan (CN); STATE GRID CORPORATION OF CHINA, Beijing (CN)

(72) Inventors: Jiusong Jiang, Hunan (CN); Fuqiang Xiong, Hunan (CN); Xigui Li, Hunan (CN); Wenqi Mao, Hunan (CN); Gang Li, Hunan (CN); Ting Zhou, Hunan (CN); Peng Sun, Hunan (CN); Wen Kang, Hunan (CN); Chaofeng Zhang, Hunan (CN); Zhiping Mao, Hunan (CN); Zuosheng Li, Hunan (CN); Kai Dong, Hunan (CN); Jianli Wu, Hunan (CN); Hong Zhang, Hunan (CN); Ling Luo, Hunan (CN); Guoqi Zhang, Hunan (CN)

(73) Assignees: STATE GRID HUNAN ELECTRIC POWER COMPANY LIMITED, Hunan (CN); STATE GRID HUNAN ELECTRIC POWER COMPANY LIMITED MAINTENANCE COMPANY, Hunan (CN); STATE GRID CORPORATION OF CHINA, Beijing (CN)

( * ) Notice: Subject to any disclaimer, the term of this patent is extended or adjusted under 35 U.S.C. 154(b) by 0 days.

(21) Appl. No.: 16/228,796

(22) Filed: Dec. 21, 2018

(65) Prior Publication Data
US 2019/0191805 A1 Jun. 27, 2019

(30) Foreign Application Priority Data

Dec. 22, 2017 (CN) .......................... 2017 1 1407486

(51) Int. Cl.
*A42B 3/04* (2006.01)
*G02B 13/14* (2006.01)
(Continued)

(52) U.S. Cl.
CPC ................ *A42B 3/042* (2013.01); *A42B 3/04* (2013.01); *A42B 3/0433* (2013.01); *A42B 3/30* (2013.01);
(Continued)

(58) Field of Classification Search
CPC ...... A42B 3/042; G06Q 10/20; G02B 23/125; G02B 27/0176; G02B 13/14; G02B 2027/0138
See application file for complete search history.

(56) References Cited

U.S. PATENT DOCUMENTS

| 6,456,261 | B1* | 9/2002 | Zhang | .................... | A42B 3/042 |
|---|---|---|---|---|---|
| | | | | | 345/7 |
| 2014/0168266 | A1* | 6/2014 | Kimura | .............. | G02B 27/0172 |
| | | | | | 345/633 |
| 2016/0048022 | A1* | 2/2016 | Shen | ..................... | G06F 1/3265 |
| | | | | | 345/8 |

* cited by examiner

*Primary Examiner* — Ahmed A Berhan
(74) *Attorney, Agent, or Firm* — JCIPRNET

(57) ABSTRACT

A wearable equipment is adapted for substation maintenance mobile inspection and includes a binding strap and a controlling wireless communication module. A thermal imager is disposed on one side of the binding strap. A prism display component and a voice interaction module are disposed on the other side of the binding strap. The thermal imager, the prism display component, and a microphone and a speaker of the voice interaction module are connected to the controlling wireless communication module through cables, to (Continued)

transmit information in a power system intranet. An application method includes mounting the wearable equipment to an electric power helmet, and automatically sending an infrared image, a visible light image, power monitoring information, voice, and a video in a power operation area to a background management controlling system for the substation maintenance mobile inspection.

8 Claims, 2 Drawing Sheets

(51) Int. Cl.
    *G02B 27/01*     (2006.01)
    *A42B 3/30*     (2006.01)
    *G08B 25/00*     (2006.01)
    *G02B 23/12*     (2006.01)
    *G08B 21/18*     (2006.01)
    *G06Q 10/00*     (2012.01)
    *G07C 3/00*     (2006.01)
    *H02B 3/00*     (2006.01)
    *H04B 1/3827*     (2015.01)

(52) U.S. Cl.
    CPC ........... *G02B 13/14* (2013.01); *G02B 23/125* (2013.01); *G02B 27/0176* (2013.01); *G08B 21/18* (2013.01); *G08B 25/007* (2013.01); *G02B 2027/0138* (2013.01); *G06Q 10/20* (2013.01)

WEARABLE EQUIPMENT FOR SUBSTATION MAINTENANCE MOBILE INSPECTION AND APPLICATION METHOD THEREOF

CROSS-REFERENCE TO RELATED APPLICATIONS

This application claims the priority benefit of China Application Serial No. 201711407486.0, filed on Dec. 22, 2017. The entirety of the above-mentioned patent application is hereby incorporated by reference herein and made a part of this application.

BACKGROUND

Technical Field

The present invention relates to substation maintenance mobile inspection equipment and a thermal defect detection technology, and specifically, to a wearable equipment for substation maintenance mobile inspection and an application method thereof.

Related Art

Currently, substation maintenance mobile inspection is manual inspection, and manual inspection results need to be recorded manually. In addition, during manual inspection, it is usually difficult to find a potential thermal defect, and the inspection effect is unsatisfactory.

SUMMARY

Technical problem to be solved by the present invention: With regard to the foregoing problems in the prior art, wearable equipment for substation maintenance mobile inspection and an application method thereof are provided, and the present invention can automatically record a manual inspection result and automatically send the manual inspection result to a background management controlling system, can find a potential thermal defect, and has higher safety and reliability.

To resolve the foregoing technical problems, following technical solutions are used in the present invention.

The present invention provides a wearable equipment adapted for substation maintenance mobile inspection. The wearable equipment includes a binding strap and a controlling wireless communication module. A thermal imager is disposed on one side of the binding strap. A prism display component and a voice interaction module are disposed on the other side of the binding strap. The voice interaction module includes a microphone and a speaker. The thermal imager, the prism display component, and the microphone and the speaker of the voice interaction module are connected to the controlling wireless communication module respectively through cables. A battery module is built in the controlling wireless communication module, and the battery module is connected to the thermal imager and the prism display component respectively through cables.

Preferably, the binding strap is in a ring shape and has a hook configured to fasten to a helmet.

Preferably, a first mounting seat is disposed on the binding strap, and the thermal imager is mounted on the first mounting seat through a bearing.

Preferably, the prism display component includes a prism and a micro projector configured to project a picture to the prism.

Preferably, a second mounting seat is disposed on the binding strap, and the prism display component is mounted on the second mounting seat through a link assembly.

Preferably, the link assembly includes a storage box and a connection rod, the storage box is mounted on the second mounting seat. The prism display component is mounted on an end portion of the connection rod, and the other end portion of the connection rod is hingedly connected to the storage box through a rotary shaft. A storage slot configured to store the connection rod and the prism display component are arranged on an outer side of the storage box, and the rotary shaft of the connection rod is disposed in a horizontal direction.

Preferably, a connection seat that is hingedly connected through a rotary shaft is disposed on the end portion of the connection rod. The prism display component is mounted on the connection seat. The rotary shaft of the connection seat and the rotary shaft of the connection rod are perpendicular to each other, and the voice interaction module is disposed on the connection seat.

Further, the present invention further provides an application method of the foregoing wearable equipment for substation maintenance mobile inspection, including following implementation steps.

Step 1: mounting the binding strap of the wearable equipment onto an electric power helmet of an operator, and starting the controlling wireless communication module to establish communication with a background management controlling system of substation maintenance mobile inspection.

Step 2: obtaining, by the operator by using an APP software on the controlling wireless communication module through a network transmission environment, an operation object temporarily edited or pre-notified by the background management controlling system, and obtaining an operation type and an operation procedure of the current operation object.

Step 3: collecting, by the operator, a code of an on-site inspection device by means of visible light quick photography of the thermal imager, and recognizing the code based on a code recognizing function of the controlling wireless communication module to determine validity of the on-site inspection device, and if the inspection device satisfies a requirement, performing step 4; otherwise, performing step 3 again.

Step 4: collecting, by the operator, an infrared image of a substation operation area in a substation by using the thermal imager, determining, by the controlling wireless communication module according to the collected infrared image, whether a temperature of the substation operation area exceeds a preset threshold, and if the temperature exceeds the preset threshold, determining that a thermal defect is found in the substation operation area, and performing step 5; otherwise, performing step 4 again.

Step 5: outputting, by the controlling wireless communication module, the infrared image by using the prism display component, raising an alarm to prompt a user to observe the infrared image, and sending an infrared image of the current operation object to the background management controlling system.

The application method of the wearable equipment for substation maintenance mobile inspection according to the present invention further includes using the wearable equipment for keyword-based intelligent association and expert rule data mining, including following specific implementation steps.

Step A1: opening an APP software installed on the controlling wireless communication module, performing automatic diagnosis of communication, and establishing wireless communication between the wearable equipment and a remote background management controlling system.

Step A2: receiving, by controlling d wireless communication module, a keyword of an on-site operation object selected and entered by a user, and if the entry fails, performing step A1 to perform automatic diagnosis of communication; otherwise, sending the selected and entered keyword to the background management controlling system.

Step A3: determining, by the background management controlling system, relevant information of the operation object based on the selected and entered keyword, where the relevant information of the operation object includes at least one of a working principle, an external size, an operation starting time, an arrangement range, a voltage level, and a danger coefficient.

Step A4: performing, by the background management controlling system, key information intelligent association of a database based on the relevant information of the operation object, if the association fails, performing step A3 to continue performing association, and after the association succeeds, generating on-site operation text based on preset expert suggestion information in the database of the background management controlling system, where the expert suggestion information includes a fault type, an operation risk point, a key step, and a classification rule of danger points; and sending the on-site operation text through a wireless network to the controlling wireless communication module.

Step A5: outputting, by the controlling wireless communication module, the on-site operation text through the prism display component and/or the voice interaction module.

The application method of the wearable equipment for substation maintenance mobile inspection according to the present invention further includes a method for implementing remote cooperative management on devices or materials, including following specific implementation steps.

Step B1: opening an APP software installed on the controlling wireless communication module, performing automatic diagnosis of communication, and establishing wireless communication between the wearable equipment and a remote background management controlling system.

Step B2: downloading, by the controlling wireless communication module by using a power generation management data network, detailed information of the devices and materials from a database of the background management controlling system to the local.

Step B3: enabling a visible light photographing function of the thermal imager, to take a photograph of the devices or materials.

Step B4: recognizing a code of the devices or materials by using the thermal imager, if the recognized code is correct, performing step B5; and if the code is not in the downloaded database, first uploading electronic information of the devices or materials, to implement a collection and statistics collection function on the devices and materials, and performing step B2 again to re-download the detailed information of the devices and materials.

Step B5: performing quick comparison on relevant information of the devices or materials by using the controlling wireless communication module, and uploading a result to the background management controlling system, to perform effective supervision in real time, where the relevant information of the devices or materials includes at least one of a name, performance, an expiry date, and an application range.

The wearable equipment for substation maintenance mobile inspection of the present invention has following advantages.

1. The present invention includes the binding strap, and the wearable equipment can be conveniently mounted onto the electric power helmet of a user through the binding strap, so that installation is convenient and fast.

2. The present invention includes the controlling wireless communication module, so as to be capable of automatically recording a manual inspection result and automatically sending the manual inspection result to the background management controlling system. The battery module is built in the controlling wireless communication module, and the battery module is connected to the thermal imager and the prism display component respectively through cables. The controlling wireless communication module is an independent structure using cables, and may usually be conveniently placed at the waist to reduce a weight on the electric power helmet, so that better experience is provided. A high-power wireless transmission module is used to ensure that long-distance transmission of data can be performed in a complex environment, and radiation impact on a user can be reduced.

3. In the present invention, the thermal imager is disposed on one side of the binding strap, and the prism display component is disposed on the other side. An infrared image in the substation maintenance mobile inspection can be conveniently collected by using the thermal imager, so as to find a potential thermal defect, thereby providing higher safety and reliability. The infrared image and relevant display information can be conveniently viewed by using the prism display component, so that a volume is small, and a structure is compact.

The application method of wearable equipment for substation maintenance mobile inspection of the present invention is an application method of the wearable equipment for substation maintenance mobile inspection of the present invention, and it also has the foregoing advantages of the wearable equipment for substation maintenance mobile inspection. In addition, according to the method, the controlling wireless communication module is directly used to perform thermal defect recognition on site on the infrared image collected by the thermal imager. Compared with the manner of performing thermal defect recognition by using the background management controlling system, the application method has higher efficiency, is more likely to find a potential thermal defect, and has higher safety and reliability.

DETAILED DESCRIPTION

Figure 1:
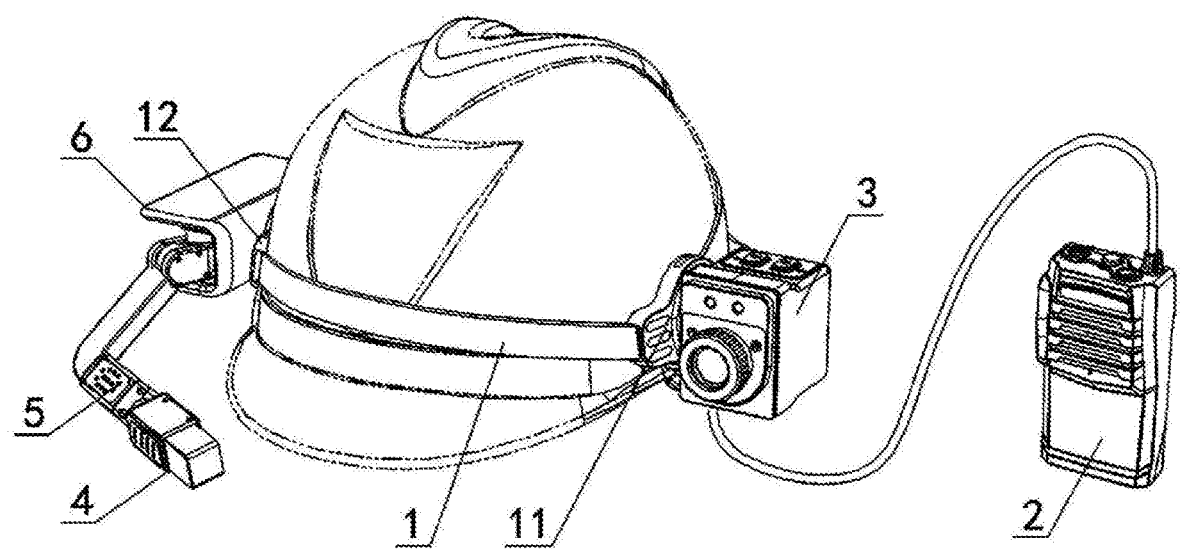
FIG. 1 is a schematic structural diagram of a wearable equipment according to an embodiment of the present invention.

As shown in FIG. 1, a wearable equipment for substation maintenance mobile inspection of an embodiment includes a binding strap 1 and a controlling wireless communication module 2. A thermal imager 3 is disposed on one side of the binding strap 1. A prism display component 4 and a voice interaction module 5 are disposed on the other side of the binding strap 1. The voice interaction module 5 includes a microphone and a speaker. The thermal imager 3, the prism display component 4, and the microphone and the speaker of the voice interaction module 5 are connected to the controlling wireless communication module 2 respectively through cables. A battery module is built in the controlling wireless communication module 2, and the battery module is connected to the thermal imager 3 and the prism display component 4 respectively through cables. This embodiment includes the binding strap 1, and the wearable equipment can be conveniently mounted onto the electric power helmet of a user through the binding strap 1, so that installation is convenient and fast. This embodiment includes the controlling wireless communication module 2, so as to be capable of automatically recording a manual inspection result and automatically sending the manual inspection result to a background management controlling system. The battery module is built in the controlling wireless communication module 2, and the battery module is connected to the thermal imager 3 and the prism display component 4 respectively through cables. The controlling wireless communication module 2 is an independent structure using cables, and may usually be conveniently placed at the waist to reduce a weight on the electric power helmet, so that better experience is provided. A high-power wireless transmission module is used as the controlling wireless communication module 2 to ensure that long-distance transmission of data can be performed in a complex environment, and radiation impact on a user can be reduced. In this embodiment, the thermal imager 3 is disposed on one side of the binding strap 1, and the prism display component 4 is disposed on the other side. An infrared image in the substation maintenance mobile inspection can be conveniently collected by using the thermal imager 3, so as to find a potential thermal defect, thereby providing higher safety and reliability. The infrared image and relevant display information can be conveniently viewed by using the prism display component 4, so that a volume is small, and a structure is compact. The wearable equipment for substation maintenance mobile inspection of this embodiment has a function of transmitting an infrared picture and a visible light picture in a wireless manner, thereby implementing a real-time visible light video receiving function and a voice interaction function. In addition, a picture/video in a memory can be automatically loaded to a to-be-analyzed list, a function of performing secondary analysis on an infrared picture of a photographed thermal area is possessed, analysis objects, such as a point, a line, and a box, are added, color codes of primary colors of the picture are adjusted, a report in a text format for the infrared picture can be automatically generated. A voice annotation in the infrared picture is converted into text and automatically added to the generated report, and the original image/video and sound, and a text report of a position and a time can be transmitted to the background, so that a background observer and a front-end on-site builder can perform voice interaction and share information. The following functions can be implemented: (1) performing electric power maintenance planning and preliminary exploration; (2) automatically generating a work ticket and a standard card; (3) managing and controlling a maintenance operation process; (4) performing mobile operation application of an electric power maintenance accceptation check; (5) managing instruments, tools, and spare materials; and (6) professionally inspecting various devices.

In this embodiment, the binding strap 1 is in a ring shape and has a hook configured to fasten to a helmet. By using the foregoing structure, the binding strap 1 can be conveniently and firmly mounted and fastened onto an electric power helmet.

Figure 2:
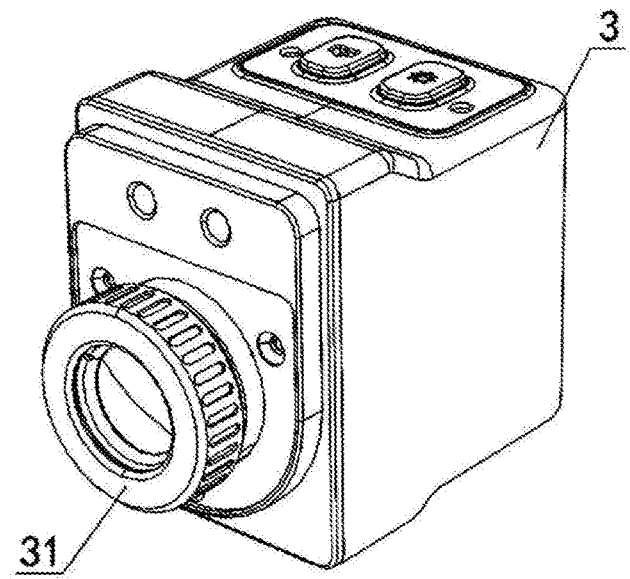
FIG. 2 is a schematic diagram of an installation structure of a thermal imager according to an embodiment of the present invention.

As shown in FIG. 2, a first mounting seat 11 is disposed on the binding strap 1, and the thermal imager 3 is mounted on the first mounting seat 11 through a bearing 31. An angle of the thermal imager 3 can be conveniently adjusted through the bearing 31, so as to collect infrared images of a substation operation area in substations having different heights by using the thermal imager 3.

In this embodiment, the thermal imager 3 is configured to collect infrared and visible light data. An infrared detector in the thermal imager 3 has 384×288 pixels and an image frame frequency of 25 Hz, so that the image is not sluggish, a temperature measuring frequency is high, and even if an operator is walking, a hot spot that quickly passes by would not be missed. In addition, the thermal imager 3 may alternatively be optimized by additionally mounting a 12° telephoto lens, a 7° telephoto lens, or the like to the thermal imager 3.

Figure 3:
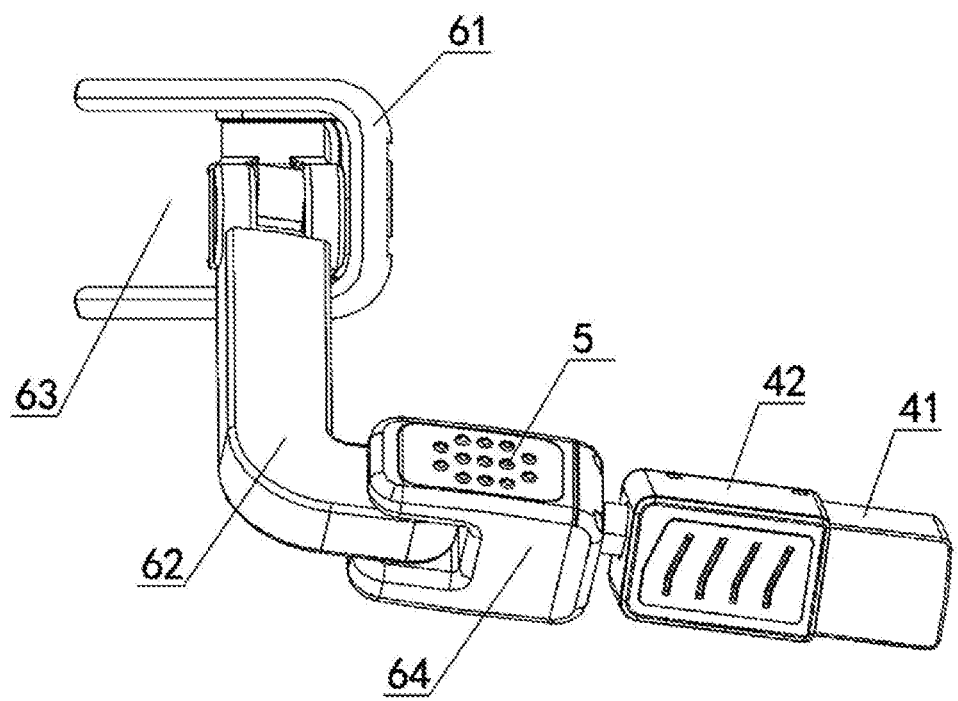
FIG. 3 is a front schematic structural diagram of a link assembly and a prism display component according to an embodiment of the present invention.
Figure 4:
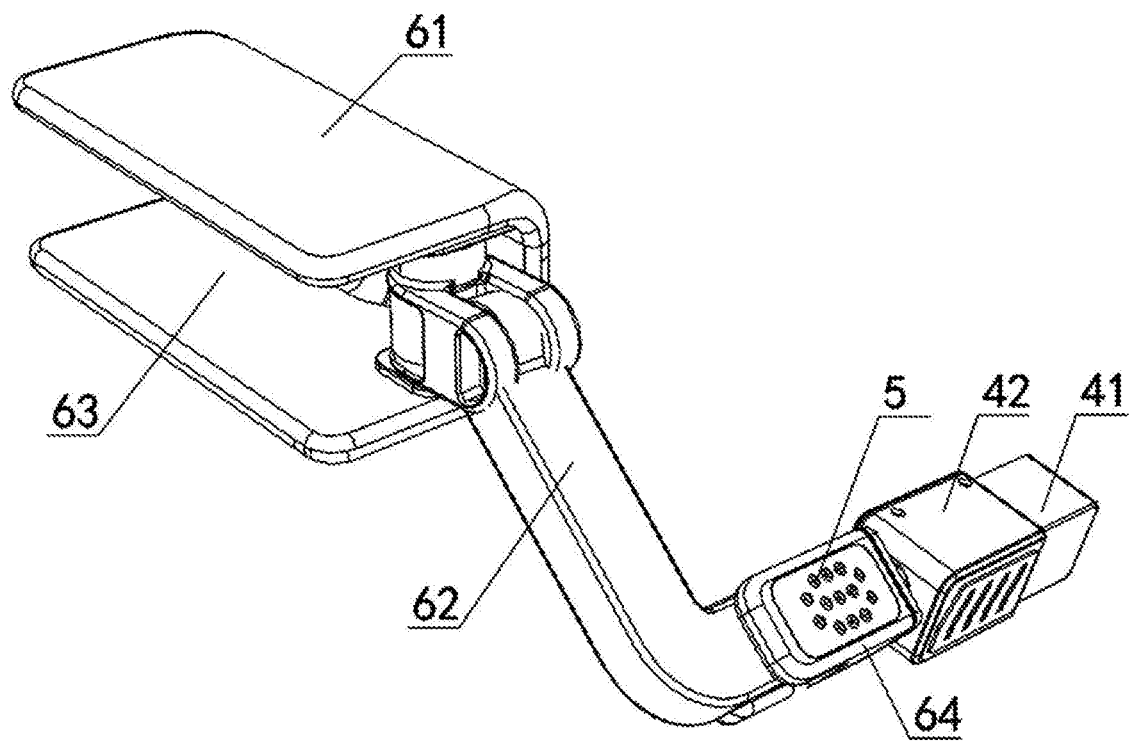
FIG. 4 is a three-dimensional schematic structural diagram of a link assembly and a prism display component according to an embodiment of the present invention.

As shown in FIG. 3 and FIG. 4, the prism display component 4 includes a prism 41 and a micro projector 42 configured to project a picture to the prism 41. The prism display component 4 is constituted by the prism 41 and the micro projector 42 and configured to display and observe an infrared target object. The micro projector 42 is used to project a picture to the prism 41 to generate a virtual image reflected into human eyes, and an image is particularly clear. Different from an ordinary monocular view finder, because a virtual image is formed, during observation, it is unnecessary to close the other eye. In addition, compared with a conventional display structure, the prism display component 4 is smaller, lighter, and more convenient.

As shown in FIG. 1, a second mounting seat 12 is disposed on the binding strap 1, and the prism display component 4 is mounted on the second mounting seat 12 through a link assembly 6. The link assembly 6 is configured to adjust an observation angle of the prism display component 4, so as to facilitate observing a power device in a substation at a high place or a low place. It is unnecessary to look up for observation.

As shown in FIG. 3 and FIG. 4, the link assembly 6 includes a storage box 61 and a connection rod 62. The storage box 61 is mounted on the second mounting seat 12. The prism display component 4 is mounted on an end portion of the connection rod 62, and the other end portion of the connection rod 62 is hingedly connected to the storage box 61 through a rotary shaft. A storage slot 63 configured to store the connection rod 62 and the prism display component 4 is arranged on an outer side of the storage box 61. The link assembly 6 is ergonomically designed, is sturdy and durable, has a moderate length, and is flexibly adjustable. During usage, the connection rod 62 and the prism display component 4 are pulled out from the storage slot 63 of the storage box 61. After usage is finished, the connection rod 62 and the prism display component 4 are stored by using the storage slot 63, to protect the prism display component 4 from being damaged. In addition, components (the connection rod 62 and the prism display component 4) can be orderly stored and have a clean and beautiful appearance, and protection for the prism display component 4 is improved.

As shown in FIG. 3 and FIG. 4, the rotary shaft of the connection rod 62 is disposed in a horizontal direction, so as to conveniently adjust a position of the prism display component 4, so that the prism display component 4 adapts to demands of different users.

As shown in FIG. 3 and FIG. 4, a connection seat 64 that is hingedly connected through a rotary shaft is disposed on the end portion of the connection rod 62, and the prism display component 4 is mounted on the connection seat 64. Adjustment in two degrees of freedom can be achieved based on two adjustment structures, namely, the rotary shaft of the connection rod 62 and the rotary shaft of the connection seat 64, so that the prism display component 4 adapts to demands of different users.

In this embodiment, the rotary shaft of the connection seat 64 and the rotary shaft of the connection rod 62 are perpendicular to each other. Adjustment in two degrees of freedom can be achieved based on two adjustment structures, namely, the rotary shaft of the connection rod 62 and the rotary shaft of the connection seat 64, and moving directions of the two degrees of freedom are perpendicular to each other, so that adjustment efficiency is higher.

As shown in FIG. 3 and FIG. 4, the voice interaction module 5 is disposed on the connection seat 64, to help a user perform voice communication with the background management controlling system.

In this embodiment, an application method of the wearable equipment for substation maintenance mobile inspection includes following implementation steps.

Step 1: mounting the binding strap 1 of the wearable equipment onto an electric power helmet of an operator, and starting the controlling wireless communication module 2 to establish communication with a background management controlling system of substation maintenance mobile inspection.

Step 2: obtaining, by the operator by using an APP software on the controlling wireless communication module 2 through a network transmission environment, an operation object temporarily edited or pre-notified by the background management controlling system, and obtaining an operation type and an operation procedure of the current operation object.

Step 3: collecting, by the operator, a code of an on-site inspection device by means of visible light quick photography of the thermal imager 3, and recognizing the code based on a code recognizing function of the controlling wireless communication module 2 to determine validity of the on-site inspection device, and if the inspection device satisfies a requirement, performing step 4; otherwise, performing step 3 again.

Step 4: collecting, by the operator, an infrared image of a substation operation area in a substation by using the thermal imager 3, determining, by the controlling wireless communication module 2 according to the collected infrared image, whether a temperature of the substation operation area exceeds a preset threshold, and if the temperature exceeds the preset threshold, determining that a thermal defect is found in the substation operation area, and performing step 5; otherwise, performing step 4 again.

Step 5: outputting, by the controlling wireless communication module 2, the infrared image by using the prism display component 4, raising an alarm to prompt a user to observe the infrared image, and sending an infrared image of the current operation object to the background management controlling system.

In this embodiment, the application method is adapted for the wearable equipment for substation maintenance mobile inspection, which includes a procedure editing method based on an event task object. The application method includes, for a temporarily edited or pre-notified operation object, obtaining, by an APP software connected to the control module in a wireless manner, an operation type and an operation procedure of the operation object through a network transmission environment and a keyword-based intelligent association and expert rule data mining technology, so as to effectively supervise an on-site operation, thereby resolving a problem that a data model cannot be quickly built for a complex operation object. According to the procedure editing method, whether a task is properly decomposed and whether an association degree is high can be determined. In a multi-task processing process, completion degrees of different tasks and a scope of mutual impact between the different tasks can be determined. If in the multi-task processing condition, a task is abnormal, the procedure editing method can implement a rapid pre-alarming function, to help an operator formulate a proper operation procedure.

In this embodiment, in the procedure editing method based on an event task object included in the application method of the wearable equipment for substation maintenance mobile inspection, the keyword-based intelligent association and expert rule data mining technology includes following implementation steps.

Step A1: opening an APP software installed on the controlling wireless communication module 2, performing automatic diagnosis of communication, and establishing wireless communication between the wearable equipment and a remote background management controlling system.

Step A2: receiving, by controlling wireless communication module 2, a keyword of an on-site operation object selected and entered by a user, and if the entry fails, performing step A1 to perform automatic diagnosis of communication; otherwise, sending the selected and entered keyword to the background management controlling system.

Step A3: determining, by the background management controlling system, relevant information of the operation object based on the selected and entered keyword, where the relevant information of the operation object includes at least one of a working principle, an external size, an operation starting time, an arrangement range, a voltage level, and a danger coefficient.

Step A4: performing, by the background management controlling system, key information intelligent association of a database based on the relevant information of the operation object, if the association fails, performing step A3 to continue performing association, and after the association succeeds, generating on-site operation text based on preset expert suggestion information in the database of the background management controlling system, where the expert suggestion information includes a fault type, an operation risk point, a key step, and a classification rule of danger points; and sending the on-site operation text through a wireless network to the controlling wireless communication module 2.

Step A5: outputting, by the controlling wireless communication module 2, the on-site operation text through the prism display component 4 and/or the voice interaction module 5.

In this embodiment, the application method of the wearable equipment for substation maintenance mobile inspection includes a method for implementing remote cooperative management on devices and materials, which includes that: a recognition module is built in a control module of the wearable equipment for substation maintenance mobile inspection, and is configured to implement an electronic information collection and statistics collection function on the devices and materials by using a quick photographing and code recognition function of the wearable equipment. A transmission module is built in a wireless communication module of the wearable equipment for substation maintenance mobile inspection and is configured to remotely transmit, download, and upload information of the devices and materials by using a power generation management data network. A comparison module is built in the control module of the wearable equipment for substation maintenance mobile inspection, and is configured to perform quick comparison on relevant information, such as a name, performance, an expiry date, and an application range, of the devices and materials by using a big data information matching method, to enable the big data information to strongly support management and control on the on-site operation.

The method overcomes the difficulty in life-cycle management on the devices and materials used on the operation site, and mainly implements electronic information management and automatic comparison functions on the devices and materials.

In this embodiment, in the application method of the wearable equipment for substation maintenance mobile inspection, the method for implementing remote cooperative management on devices and materials includes following implementation steps.

Step B1: opening an APP software installed on the controlling wireless communication module 2, performing automatic diagnosis of communication, and establishing wireless communication between the wearable equipment and a remote background management controlling system.

Step B2: downloading, by the controlling wireless communication module 2 by using a power generation management data network, detailed information of the devices and materials from a database of the background management controlling system to the local.

Step B3: enabling a visible light photographing function of the thermal imager 3, to take a photograph of the devices or materials.

Step B4: recognizing a code of the devices or materials by using the thermal imager 3, if the recognized code is correct, performing step B5; and if the code is not in the downloaded database, first uploading electronic information of the devices or materials, to implement a collection and statistics collection function on the devices and materials, and performing step B2 again to re-download the detailed information of the devices and materials.

Step B5: performing quick comparison on relevant information of the devices or materials by using the controlling wireless communication module 2, and uploading a result to the background management controlling system, to perform effective supervision in real time, where the relevant information of the devices or materials includes at least one of a name, performance, an expiry date, and an application range.

In this embodiment, technical effects of the application method of the wearable equipment for substation maintenance mobile inspection are: collecting and transmitting information, such as a picture, audio, a video, a position, and a time, by using the wearable equipment for substation maintenance mobile inspection, to provide a path for whole-process management and control for different operations types, different operation text, and different device types. In addition, the APP software is used to transmit and process event task data to improve effectiveness of task processing and coordination of operators. The method for implementing remote cooperative management on devices and materials can provide an automatic information comparison function and improve working efficiency of an operator and accuracy in information collection.

The descriptions above are preferred implementations of the present invention. The protection scope of the present invention is not limited to the foregoing embodiments. All the technical solutions belonging to the concept of the present invention fall within the protection scope of the present invention. It should be noted that for a person of ordinary skill in the art, several improvements and modifications made without departing from the principle of the present invention should also be considered to fall within the protection scope of the present invention.

What is claimed is:

1. A wearable equipment for substation maintenance mobile inspection, the wearable equipment comprising: a binding strap and a controlling wireless communication module, wherein a thermal imager is disposed on one side of the binding strap, a prism display component and a voice interaction module are disposed on the other side of the binding strap, the voice interaction module comprises a microphone and a speaker, the thermal imager, the prism display component, and the microphone and the speaker of the voice interaction module are connected to the controlling wireless communication module respectively through cables, a battery module is built in the controlling wireless communication module, and the battery module is connected to the thermal imager and the prism display component respectively through cables, wherein a first mounting seat and a second mounting seat are disposed on the binding strap, and the prism display component is mounted on the second mounting seat through a link assembly, wherein the link assembly comprises a storage box and a connection rod, the storage box is mounted on the second mounting seat, the prism display component is mounted on an end portion of the connection rod, the other end portion of the connection rod is hingedly connected to the storage box through a rotary shaft, a storage slot configured to store the connection rod and the prism display component are arranged on an outer side of the storage box, and the rotary shaft of the connection rod is disposed in a horizontal direction.

2. The wearable equipment according to claim 1, wherein the binding strap is in a ring shape and has a hook configured to fasten to a helmet.

3. The wearable equipment according to claim 1, wherein the thermal imager is mounted on the first mounting seat through a bearing.

4. The wearable equipment according to claim 1, wherein the prism display component comprises a prism and a micro projector configured to project a picture to the prism.

5. The wearable equipment according to claim 1, wherein a connection seat that is hingedly connected through a rotary shaft is disposed on the end portion of the connection rod, the prism display component is mounted on the connection seat, the rotary shaft of the connection seat and the rotary shaft of the connection rod are perpendicular to each other, and the voice interaction module is disposed on the connection seat.

6. An application method of the wearable equipment for substation maintenance mobile inspection according to claim 1, the application method comprising following implementation steps:

step 1, mounting the binding strap of the wearable equipment onto an electric power helmet of an operator, and starting the controlling wireless communication module to establish communication with a background management controlling system of the substation maintenance mobile inspection;

step 2, obtaining, by the operator by using an APP software on the controlling wireless communication module through a network transmission environment, an operation object that is temporarily edited or pre-notified by the background management controlling system, and obtaining an operation type and an operation procedure of the current operation object;

step 3, collecting, by the operator, a code of an on-site inspection device by means of visible light quick photography of the thermal imager, and recognizing the code based on a code recognizing function of the controlling wireless communication module to determine validity of the on-site inspection device, and if the inspection device satisfies a requirement, performing step 4; otherwise, performing step 3 again;

step 4, collecting, by the operator, an infrared image of a substation operation area in a substation by using the thermal imager, determining, by the controlling wireless communication module according to the collected infrared image, whether a temperature of the substation operation area exceeds a preset threshold, and if the temperature exceeds the preset threshold, determining that a thermal defect is found in the substation operation area, and performing step 5; otherwise, performing step 4 again; and step 5, outputting, by the controlling wireless communication module, the infrared image by using the prism display component, raising an alarm to prompt a user to observe the infrared image, and sending an infrared image of the current operation object to the background management controlling system.

7. An application method of the wearable equipment for substation maintenance mobile inspection according to claim 1, comprising using the wearable equipment for keyword-based intelligent association and expert rule data mining, comprising following specific implementation steps:

step A1, opening an APP software installed on the controlling wireless communication module, performing automatic diagnosis of communication, and establishing wireless communication between the wearable equipment and a remote background management controlling system;

step A2, receiving, by controlling wireless communication module, a keyword of an on-site operation object selected and entered by a user, and if the entry fails, performing step A1 to perform automatic diagnosis of communication; otherwise, sending the selected and entered keyword to the background management controlling system;

step A3, determining, by the background management controlling system, relevant information of the operation object based on the selected and entered keyword, wherein the relevant information of the operation object comprises at least one of a working principle, an external size, an operation starting time, an arrangement range, a voltage level, and a danger coefficient;

step A4, performing, by the background management controlling system, key information intelligent association of a database based on the relevant information of the operation object, if the association fails, performing step A3 to continue performing association, and after the association succeeds, generating on-site operation text based on preset expert suggestion information in the database of the background management controlling system, wherein the expert suggestion information comprises a fault type, an operation risk point, a key step, and a classification rule of danger points; and sending the on-site operation text through a wireless network to the controlling wireless communication module; and step A5, outputting, by the controlling wireless communication module, the on-site operation text through the prism display component and/or the voice interaction module.

8. An application method of the wearable equipment for substation maintenance mobile inspection according to claim 1, comprising a method for implementing remote cooperative management on devices or materials, comprising following specific implementation steps:

step B1, opening an APP software installed on the controlling wireless communication module, performing automatic diagnosis of communication, and establishing wireless communication between the wearable equipment and a remote background management controlling system;

step B2, downloading, by the controlling wireless communication module by using a power generation management data network, detailed information of the devices and materials from a database of the background management controlling system to the local;

step B3, enabling a visible light photographing function of the thermal imager, to take a photograph of the devices or materials;

step B4, recognizing a code of the devices or materials by using the thermal imager, if the recognized code is correct, performing step B5; and if the code is not in the downloaded database, first uploading electronic information of the devices or materials, to implement a collection and statistics collection function on the devices and materials, and performing step B2 again to re-download the detailed information of the devices and materials; and step B5, performing quick comparison on relevant information of the devices or materials by using the controlling wireless communication module, and uploading a result to the background management controlling system, to perform effective supervision in real time, wherein the relevant information of the devices or materials comprises at least one of a name, performance, an expiry date, and an application range.

* * * * *